(12) United States Patent
Yanohara et al.

(10) Patent No.: US 8,302,737 B2
(45) Date of Patent: Nov. 6, 2012

(54) MAIN-SHAFT LUBRICATION DEVICE

(75) Inventors: Naomitsu Yanohara, Aichi (JP);
Takashi Norihisa, Aichi (JP);
Tomoharu Ando, Aichi (JP)

(73) Assignee: Okuma Corporation, Aichi (JP)

( * ) Notice: Subject to any disclaimer, the term of this patent is extended or adjusted under 35 U.S.C. 154(b) by 681 days.

(21) Appl. No.: 11/979,782

(22) Filed: Nov. 8, 2007

(65) Prior Publication Data

US 2008/0110700 A1     May 15, 2008

(30) Foreign Application Priority Data

Nov. 15, 2006   (JP) ................. 2006-308851

(51) Int. Cl.
*F16N 29/04* (2006.01)
(52) U.S. Cl. .......................... 184/7.4; 184/6.1
(58) Field of Classification Search ............... 184/6, 7.4, 184/6.11
See application file for complete search history.

(56) References Cited

U.S. PATENT DOCUMENTS

| | | | |
|---|---|---|---|
| 3,831,381 A * | 8/1974 | Swearingen | 60/657 |
| 4,035,113 A * | 7/1977 | McDermott | 418/61.3 |
| 4,514,123 A | 4/1985 | Johnstone et al. | |
| 5,626,470 A * | 5/1997 | Gerhardt | 418/84 |
| 5,964,318 A | 10/1999 | Boyle et al. | |
| 6,374,950 B1 * | 4/2002 | Takeno | 184/7.4 |
| 6,722,858 B2 * | 4/2004 | Yoshimura et al. | 417/313 |
| 6,783,309 B2 * | 8/2004 | Makiyama | 409/136 |
| 6,807,977 B1 * | 10/2004 | Gaca et al. | 137/2 |
| 7,163,086 B2 * | 1/2007 | Care et al. | 184/6.11 |
| 7,500,311 B2 * | 3/2009 | Shimomura | 29/898.1 |
| 7,931,124 B2 * | 4/2011 | Glahn et al. | 184/6.11 |
| 8,191,686 B2 * | 6/2012 | Galivel | 184/6.4 |
| 2004/0213494 A1 * | 10/2004 | Shimomura | 384/473 |

FOREIGN PATENT DOCUMENTS

| | | |
|---|---|---|
| JP | 03-196942 A | 8/1991 |
| JP | 2004-076783 A | 3/2004 |

* cited by examiner

*Primary Examiner* — Sang Kim
*Assistant Examiner* — Robert T Reese
(74) *Attorney, Agent, or Firm* — Jacobson Holman PLLC (57) ABSTRACT

The amount of lubricant oil supplied to a bearing is optimized. A main-shaft lubrication device includes a supply device for variably supplying lubricant oil to bearings which support a main shaft, a collection device for collecting, from the bearings, the lubricant oil supplied from the supply device, a measurement device for measuring the amount of lubricant oil collected by the collection device, and a control device for controlling the amount of lubricant oil to be supplied from the supply device.

5 Claims, 6 Drawing Sheets

| AMOUNT OF LUBRICANT OIL COLLECTED PER UNIT TIME | 0~10 | 11~20 | 21~30 | 31~40 | 41~50 | 51~60 |
|---|---|---|---|---|---|---|
| BEARING① | ALARM | AMOUNT OF TO-BE-SUPPLIED LUBRICANT OIL A | AMOUNT OF TO-BE-SUPPLIED LUBRICANT OIL A | AMOUNT OF TO-BE-SUPPLIED LUBRICANT OIL B | AMOUNT OF TO-BE-SUPPLIED LUBRICANT OIL D | ALARM |
| BEARING② | ALARM | AMOUNT OF TO-BE-SUPPLIED LUBRICANT OIL A | AMOUNT OF TO-BE-SUPPLIED LUBRICANT OIL A | AMOUNT OF TO-BE-SUPPLIED LUBRICANT OIL C | AMOUNT OF TO-BE-SUPPLIED LUBRICANT OIL D | ALARM |
| BEARING③ | ALARM | AMOUNT OF TO-BE-SUPPLIED LUBRICANT OIL A | AMOUNT OF TO-BE-SUPPLIED LUBRICANT OIL B | AMOUNT OF TO-BE-SUPPLIED LUBRICANT OIL C | AMOUNT OF TO-BE-SUPPLIED LUBRICANT OIL D | ALARM |
| BEARING④ | ALARM | AMOUNT OF TO-BE-SUPPLIED LUBRICANT OIL B | AMOUNT OF TO-BE-SUPPLIED LUBRICANT OIL C | AMOUNT OF TO-BE-SUPPLIED LUBRICANT OIL C | AMOUNT OF TO-BE-SUPPLIED LUBRICANT OIL D | ALARM |
| BEARING⑤ | ALARM | AMOUNT OF TO-BE-SUPPLIED LUBRICANT OIL B | AMOUNT OF TO-BE-SUPPLIED LUBRICANT OIL C | AMOUNT OF TO-BE-SUPPLIED LUBRICANT OIL D | AMOUNT OF TO-BE-SUPPLIED LUBRICANT OIL E | ALARM |

Fig.6

| ROTATION SPEED (rpm) \ TEMPERATURE OF MACHINE | 0~10 | 11~20 | 21~30 | 31~40 | 41~ |
|---|---|---|---|---|---|
| ~2000 | 1.5 | 1.2 | 1 | 0.8 | 0.5 |
| ~4000 | 1.6 | 1.3 | 1.1 | 0.9 | 0.6 |
| ~6000 | 1.8 | 1.5 | 1.3 | 1.1 | 0.8 |
| ~8000 | 2 | 1.7 | 1.5 | 1.3 | 1 |
| ~10000 | 2.2 | 1.9 | 1.7 | 1.5 | 1.2 |

MAIN-SHAFT LUBRICATION DEVICE

BACKGROUND OF THE INVENTION

1. Field of the Invention

The present invention relates to a main-shaft lubricant oil supply device for adjusting the amount of to-be-supplied lubricant oil to an optimum amount, by detecting the amount of collected lubricant oil.

2. Description of the Related Art

For example, a machining tool is rotatably supported at its main shaft by a plurality of rolling bearings. Generally, a bearing is constituted by an inner ring, an outer ring, a plurality of rolling members and a holding device for holding the rolling members at equal intervals, wherein the rolling members are movably incorporated therein. The inner ring is press-fitted to the main shaft and is rotated together with the main shaft, and the outer ring is incorporated in a housing and is secured by being pressed in the axial direction by a pressing lid. Lubricant oil is filled in or supplied to the bearing, and an oil film is formed between the inner ring and outer ring and the rolling members during the rotation of the main shaft. As methods for lubricating bearings, there have been known a grease lubrication method, an oil-air lubrication method, an oil mist lubrication method, a jet lubrication method and the like. In the respective lubrication methods, the amount of lubricant oil supplied to the bearing is determined by the lubricant oil contained in the grease filled in the bearing, in the case of the grease lubrication method. In the case of the oil-air lubrication method, oil mist lubrication method and jet lubrication method, the amount of lubricant oil supplied to the bearing is determined by the amount of lubricant oil supplied from a lubricant oil supply device per set time period. In order to rotate the main shaft with high accuracy, there is a need for forming a uniform oil film, and therefore, it is required that the amount of lubricant oil supplied to the bearing be adjusted to an optimum amount. In this case, it is difficult to adjust the amount of lubricant oil with the grease lubrication method. Further, it is necessary to check if the lubricant oil has been uniformly supplied through lubricant oil supply paths, in the oil-air lubrication method, oil mist lubrication method and jet lubrication method.

In order to improve the aforementioned situations, there has been known a device for detecting abnormalities by using a device employing an optical sensor along the path between the lubricant oil supply device and the bearing (refer to Japanese Unexamined Patent Application Publication No. 2002-126909 and Japanese Unexamined Utility Model Application Publication No. 3-99300, for example).

With such a conventional device, it is possible to check the amount of lubricant oil supplied to the bearing, but it is difficult to check the amount of lubricant oil which actually exists around the rolling surface of the bearing and the rolling members and relates to lubrication, after the lubricant oil is supplied. This may result in a superfluity or shortage of lubricant oil, thereby destabilizing the oil film. This may make it difficult to rotate the main shaft with high accuracy and, in the worst case, may produce abnormal heat, thereby damaging the bearing.

Further, there has been known a main-shaft device including a device for controlling the amount of lubricant oil supplied to a bearing portion as described above, according to the rise in temperature of the lubricant oil collected from the bearing portion (refer to Japanese Unexamined Patent Application Publication No. 11-166549, for example).

With this conventional device, it is difficult to determine whether the temperature rise is caused by the shortage of lubricant oil or the superfluity of lubricant oil and also whether the temperature rise is caused by an influence of a motor in the case where the main shaft includes the motor near the bearing.

SUMMARY OF THE INVENTION

It is an object of the present invention to provide a main-shaft lubrication device capable of optimizing the amount of lubricant oil supplied to a bearing.

A main-shaft lubrication device according to the present invention includes a supply part for variably supplying lubricant oil to a bearing supporting a main shaft, a collection part for collecting, from the bearing, the lubricant oil supplied from the supply part, a measurement part for measuring the amount of lubricant oil collected by the collection part, and a control part for controlling the amount of lubricant oil to be supplied from the supply part.

With the main-shaft lubrication device according to the present invention, when the amount of lubricant oil collected from the main-shaft bearing is large, it is possible to determine that the amount of supplied lubricant oil is large and to reduce the amount of oil, and when the amount of lubricant oil collected from the main-shaft bearing is small, it is possible to increase the amount of lubricant oil to be supplied, which enables maintaining an optimum lubrication state.

Further, the bearing may include an inner ring and an outer ring which sandwich rolling members, and the outer ring may be provided with a lubricant oil ejection hole extending in a radial direction from its inner peripheral surface to its outer peripheral surface, so that the collection part can collect the lubricant oil through the lubricant oil ejection hole. This enables understanding, more accurately, the amount of lubricant oil relating to the formation of an oil film between the rolling members and the surface on which the rolling members roll. Further, when a lubricant oil supply path is provided near the surface of the bearing on which the rolling members roll, it is possible to supply a minimum amount of lubricant oil necessary for formation of the oil film. For example, in the bearing constituted by the outer ring, the inner ring, the rolling members and a holding member, a lubricant oil supply through hole and a lubricant oil collection through hole can be provided in the surface of the outer ring on which the rolling members roll, at a position through which the rolling member does not pass, for adjusting the amount of lubricant oil.

Also, the main-shaft lubrication device may include a part for stopping rotation of the main shaft when the measurement value provided by the measurement part is off by a predetermined range, which enables stopping the main shaft without damaging the bearing. For example, a predetermined upper limit and a predetermined lower limit of the amount of lubricant oil collected from the bearing may be provided and, when the amount of lubricant oil collected from the bearing is reduced below or increased above the predetermined limits, it is considered that a malfunction of the lubricant oil supply device, a breakage of the lubricant oil supply path, clogging of the lubricant oil supply hole by a foreign substance or abnormal heating of the bearing has occurred and, therefore, the main shaft and the respective devices are stopped.

Also, the main-shaft lubrication device may include at least one sensor, and information obtained from the sensor can be reflected in the amount of lubricant oil to be supplied from the supply part. This enables taking account of the information obtained from the sensor in determining the amount of lubricant oil to be supplied to the bearing from the amount of collected lubricant oil, thereby enabling provision of an amount of lubricant oil in which the state of the bearing is further reflected. For example, there will be considered a case where a sensor for detecting the rotation speed of the main shaft is mounted to the main shaft. When the rotation speed of the main shaft is high, the lubricant oil is scattered to portions other than the surface of the bearing on which the rolling members roll due to centrifugal force, which increases the amount of collected lubricant oil. Therefore, in this case, by increasing the amount of lubricant oil to be supplied in comparison with a case where the rotation speed of the main shaft is low, it is possible to optimize the amount of supplied lubricant oil.

Further, the sensor is preferably at least one of a temperature sensor and a main-shaft rotation speed sensor. For example, there will be considered a case where a sensor for detecting the rotation speed of the main shaft is mounted to the main shaft. When the rotation speed of the main shaft is high, the lubricant oil is scattered to portions other than the surface of the bearing on which the rolling members roll, which increases the amount of collected lubricant oil. Therefore, in this case, by increasing the amount of lubricant oil to be supplied in comparison with a case where the rotation speed of the main shaft is low, it is possible to optimize the amount of supplied lubricant oil. Further, there will be considered a case where a temperature sensor is mounted. The viscosity of the lubricant oil is changed with the temperature around the bearing and the temperature around the machine and, when the temperature is high, this will decrease the viscosity of the lubricant oil, but when the temperature is low, this will increase the viscosity of the lubricant oil. When the temperature is high, the amount of collected lubricant oil is increased and, therefore, the amount of lubricant oil to be supplied is increased in comparison with a case where the temperature is low.

According to the present invention, the amount of lubricant oil to be supplied is determined on the basis of the amount of lubricant oil around the bearing which relates to formation of an oil film in the bearing, which enables optimization of the amount of lubricant oil in the bearing. Further, the amount of collected lubricant oil is monitored, which is effective in detecting abnormalities of the lubricant oil supply device, the lubricant oil supply path and the bearing. Further, information obtained from the sensor, such as the temperature and the rotation speed of the main shaft, can be reflected in the amount of lubricant oil to be collected, which enables determination of an optimum amount of lubricant oil for the state of operation of the main shaft.

DETAILED DESCRIPTION OF THE PREFERRED EMBODIMENTS

Hereinafter, embodiments of the present invention will be described with reference to the drawings.

Figure 1:
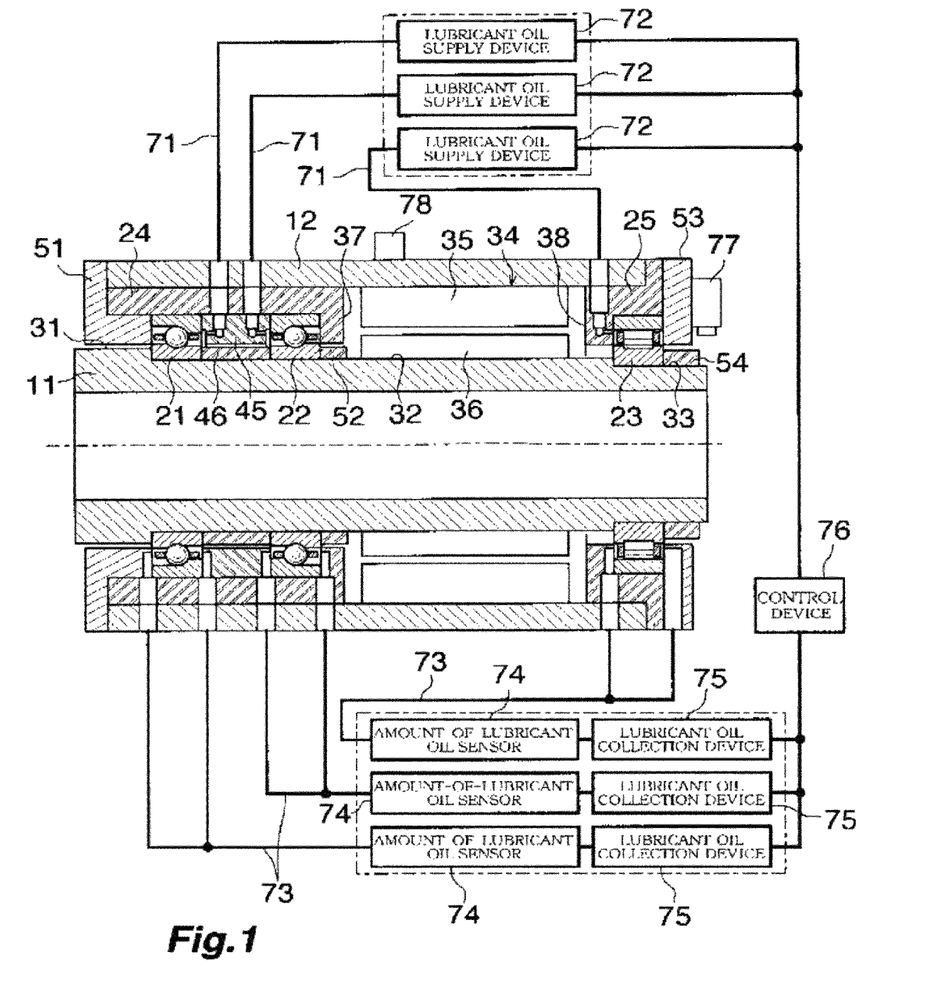
FIG. 1 is a longitudinal cross-sectional view of a main-shaft lubrication device according to the present invention.

In the following description, "left" and "right" are defined such that the left side in FIG. 1 is referred to as a "left side" and the side opposite therefrom is referred to as a "right side". Further, the left side denotes a front side, and the right side denotes a rear side.

A main shaft device includes a horizontal hollow-shaft-shaped main shaft 11, a horizontal cylindrical-shaped sleeve 12 surrounding the main shaft 11, a first bearing 21 and a second bearing 22 which are axially spaced apart from each other for supporting the left side of the main shaft 11, a third bearing 23 for supporting the right side of the main shaft 11, a left-side housing 24 secured to the inner surface of the sleeve 12 such that it surrounds the first bearing 21 and the second bearing 22, and a right-side housing 25 secured to the inner surface of the sleeve 12 such that it surrounds the third bearing 23.

The main shaft 11 is provided, at its outer surface, a larger-diameter portion 31, an intermediate-diameter portion 32 and a smaller-diameter portion 33 which are continuous with one another in series, with steps interposed thereamong, from the left side to the right side thereof.

The stator 35 in a motor 34 is secured to the inner surface of the sleeve 12 between the second bearing 22 and the third bearing 23. The rotor 36 in the motor 34 is secured to the outer surface of the main shaft 11 such that it is faced to the stator 35.

A left-side annular-shaped inward protruding portion 37 is provided at the right end of the inner surface of the left-side housing 24. A right-side annular-shaped inward protruding portion 38 is provided at the left end of the inner surface of the right-side housing 25.

Figure 2:
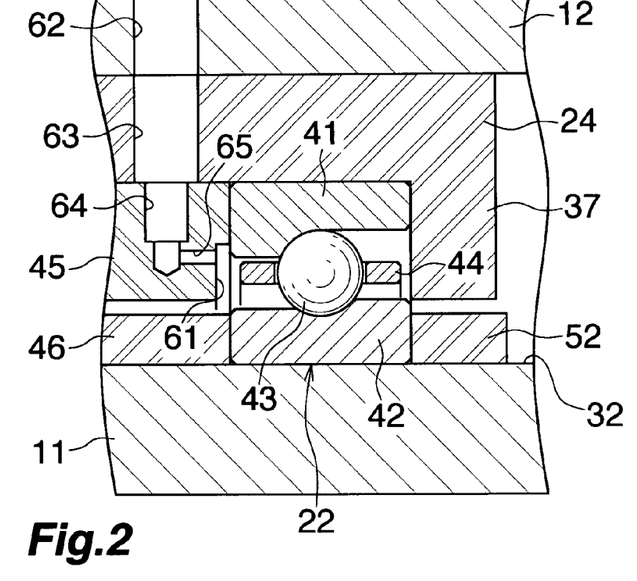
FIG. 2 is a cross-sectional view illustrating a portion of FIG. 1 in an enlarged manner.

The first to third bearings 21 to 23 have the same structure. FIG. 2 illustrates in detail the upper portion of the second bearing 22. The second bearing 22 is constituted by an outer ring 41 secured to the inner surface of the left-side housing 24, an inner ring 42 secured to the outer surface of the main shaft 11, a plurality of rolling members 43 interposed between the outer ring 41 and the inner ring 42, and a holding device 44 which rotates together with the rolling members 43 with the inner surface of the outer ring 41 serving as a guide surface for holding the rolling members 43 at constant intervals.

Referring to FIG. 1 again, an outer-ring spacer 45 secured to the inner surface of the left-side housing 24 is interposed between the outer rings 41 in the first bearing 21 and the second bearing 22. An inner-ring spacer 46 secured to the outer surface of the main shaft 11 is interposed between the inner rings 42 in the bearings 21 and 22.

There is provided a left-side pressing lid 51 at a left-side opening of the sleeve 12. The left-side pressing lid 51 presses the outer rings 41 in the first bearing 21 and the second bearing 22 together with the outer-ring spacer 45 against the left-side annular-shaped inward protruding portion 37. A left-side pressing nut 52 is threadably fitted at the right of the second bearing 22. The left-side pressing nut 52 presses the inner rings 42 in the first bearing 21 and the second bearing 22 together with the inner-ring spacer 46 against the step between the larger-diameter portion 31 and the intermediate-diameter portion 32. There is provided a right-side pressing lid 53 at a right-side opening of the sleeve 12. The right-side pressing lid 53 presses the outer ring 41 in the third bearing 23 against the right-side annular-shaped inward protruding portion 38. A right-side pressing nut 54 is threadably fitted at the right side of the third bearing 23. The right-side pressing nut 54 presses the inner ring 42 in the third bearing 23 against the step between the intermediate-diameter portion 32 and the smaller-diameter portion 33.

Referring to FIG. 2 again, an inward opened annular-shaped slot 61 is formed in the right side surface of the outer-ring spacer 45, such that it is faced to the gap between the outer ring 41 and the inner ring 42 in the second bearing 22. Immediately to the left of the second bearing 22, an outer lubricant oil supply hole 62 is formed in the sleeve 12, an inner lubricant oil supply hole 63 is formed in the left-side housing 24, and an inner lubricant oil supply hole 64 is formed in the outer-ring spacer 45, such that these holes are continuous with one another along a straight line in the inward and outward directions. The annular-shaped slot 61 is communicated with the bottom portion of the inner lubricant oil supply hole 64 through a communication hole 65. Such an outer lubricant oil supply hole 62, an inner lubricant oil supply hole 63, an inner lubricant oil supply hole 64 and a communication hole 65 are also formed at the right side of the first bearing 21 and at the left side of the third bearing 23, in the same way.

Figure 3:
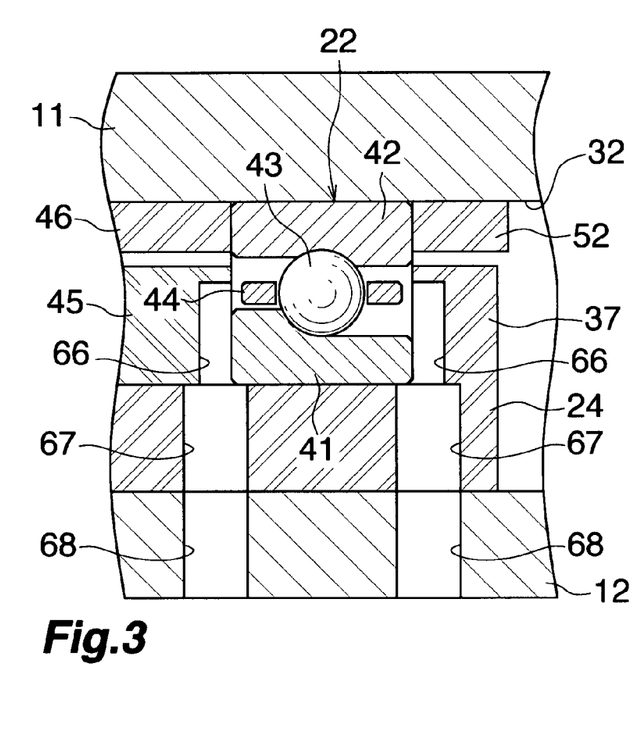
FIG. 3 is a cross-sectional view illustrating a portion of FIG. 1 other than the portion of FIG. 2, in an enlarged manner.

FIG. 3 illustrates in detail the lower portion of the second bearing 22 and the periphery thereof. An arc-shaped collection slot 66 is formed in the bottom portion of the right-side surface of the outer-ring spacer 45, such that it faces the gap between the outer ring 41 and the inner ring 42. An inner lubricant oil ejection hole 67 is formed in the housing 24 in such a way that it penetrates through the housing 24 inwardly and outwardly such that it is communicated with the lower-most portion of the collection slot 66. Further, an outer lubricant oil ejection hole 68 is formed in the sleeve in such a way that it penetrates through the sleeve inwardly and outwardly, such that the outer lubricant oil ejection hole 68 and the inner lubricant oil ejection hole 67 are arranged along a straight line. A collection slot 66 and an inner lubricant oil ejection hole 67 are formed in the housing 24 and an outer lubricant oil ejection hole 68 is formed in the sleeve 12, at the right of the second bearing 22, similarly to the aforementioned collection slot 66, the inner lubricant oil ejection hole 67 and the outer lubricant oil ejection hole 68.

Returning to FIG. 1, lubricant oil supply pipes 71 are communicated with the respective outer lubricant oil supply holes 62. There are provided lubricant oil supply devices 72 on the lubricant oil supply pipes 71. The outer lubricant oil ejection holes 68 are communicated with lubricant oil collection pipes 73. An amount-of-lubricant oil sensor 74 and a lubricant oil collection device 75 are provided along a straight line, on each lubricant oil collection pipe 73. The lubricant oil supply devices 72 and the lubricant oil collection devices 75 are controlled by a control device 76.

A rotation-speed detection sensor 77 is mounted to the side surface of the right-side pressing lid 53 such that it faces the right end portion of the main shaft 11. An acceleration detection sensor 77 is mounted to the intermediate portion of the outer surface of the sleeve 12 in the longitudinal direction.

Figure 4:
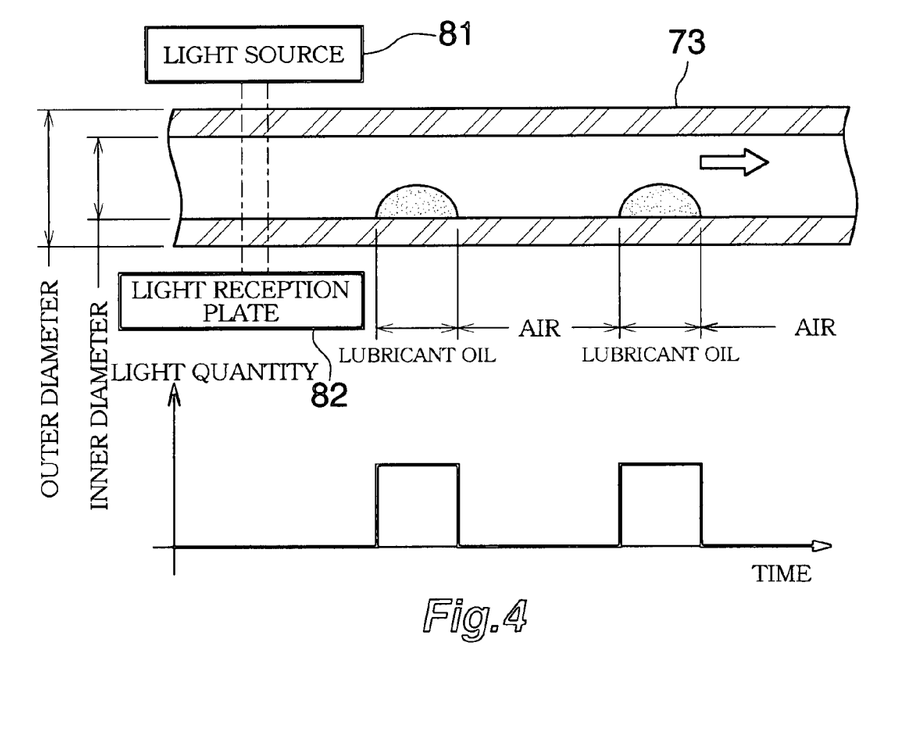
FIG. 4 is an explanatory view illustrating the principle of an amount-of-lubricant oil sensor in the main-shaft lubrication device.

The amount-of-lubricant oil sensor 74 is constituted by a light source 81 for emitting light, alight reception plate 82 for receiving the light, a device (not illustrated) for providing power to the light source 81 and the light reception plate 82, and a control device (not illustrated) for controlling the light source 81 and the light reception plate 82, as illustrated in FIG. 4.

Next, operations of supplying and collecting the lubricant oil will be described.

The lubricant oil collection devices 75 (which are devices capable of creating suction force, such as pumps) draw the lubricant oil ejected from the bearings 21 to 23 into the lubricant oil collection pipes 73 (which are constituted by resin tubes with sufficient transparency) with constant suction force. By setting the amount of lubricant oil which can be collected thereby to be sufficiently greater than the amount of supplied lubricant oil, it is possible to create a state where air and the lubricant oil exist within the lubricant oil collection pipes 73. The lubricant oil within the lubricant oil collection pipes 73 is detected by passing each lubricant oil collection pipe 73 between the light source 82 and the light reception plate 82 in the amount-of-lubricant oil sensor 74 and by using the difference in transparency between air and the lubricant oil. As illustrated in FIG. 4, when the lubricant oil passes between the light source 81 and the light reception plate 82, the sensor 74 reacts thereto and outputs a signal, but when air passes therebetween, the sensor 74 outputs no signal. The time during which signals are outputted is integrated to detect the amount of the lubricant oil within the lubricant oil collection pipe 73 which flows during unit time.

While an optical sensor is used as the amount-of-lubricant oil sensor 74 in the present embodiment, it is also possible to use a sensor utilizing infrared radiation (not illustrated) or a sensor utilizing a magnetic field (not illustrated).

Figure 5:
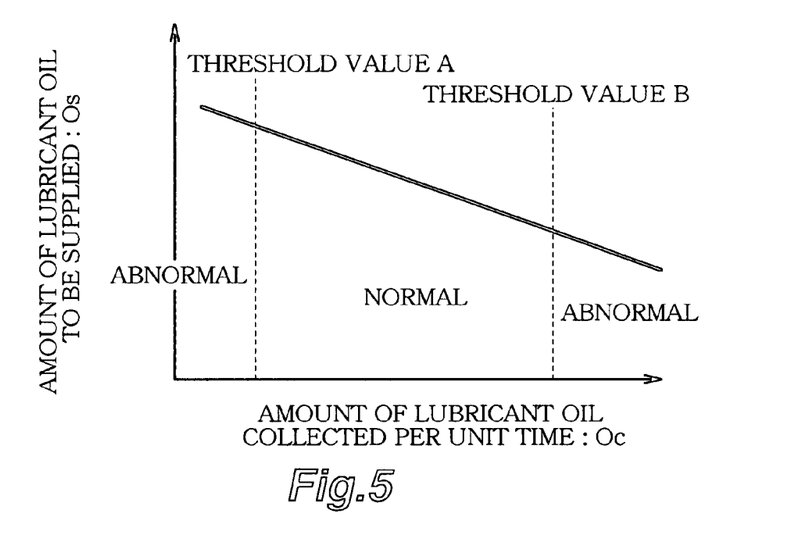
FIG. 5 is a graph illustrating a relationship between the amount of supplied lubricant oil and the amount of collected lubricant oil.

The control device 76 records the amount of collected lubricant oil detected by the amount-of-lubricant oil sensor 74. Then, the lubricant oil supply devices 72 supply a predetermined amount of lubricant oil to be supplied corresponding to the amount of collected lubricant oil. As the predetermined amount of lubricant oil, 0.01 cc (an amount of lubricant oil to be supplied) can be set per 50 (a time period during which pulses were detected). Also, the amount of lubricant oil (Os) can be calculated from the following equation, as illustrated in FIG. 5.

$$Os = A \times EXP(B \times Oc/C) + D$$

where A is a factor 1, B is a factor 2, C is a factor 3, D is a factor 4, and Oc is an amount of lubricant oil collected per unit time.

Figure 6:
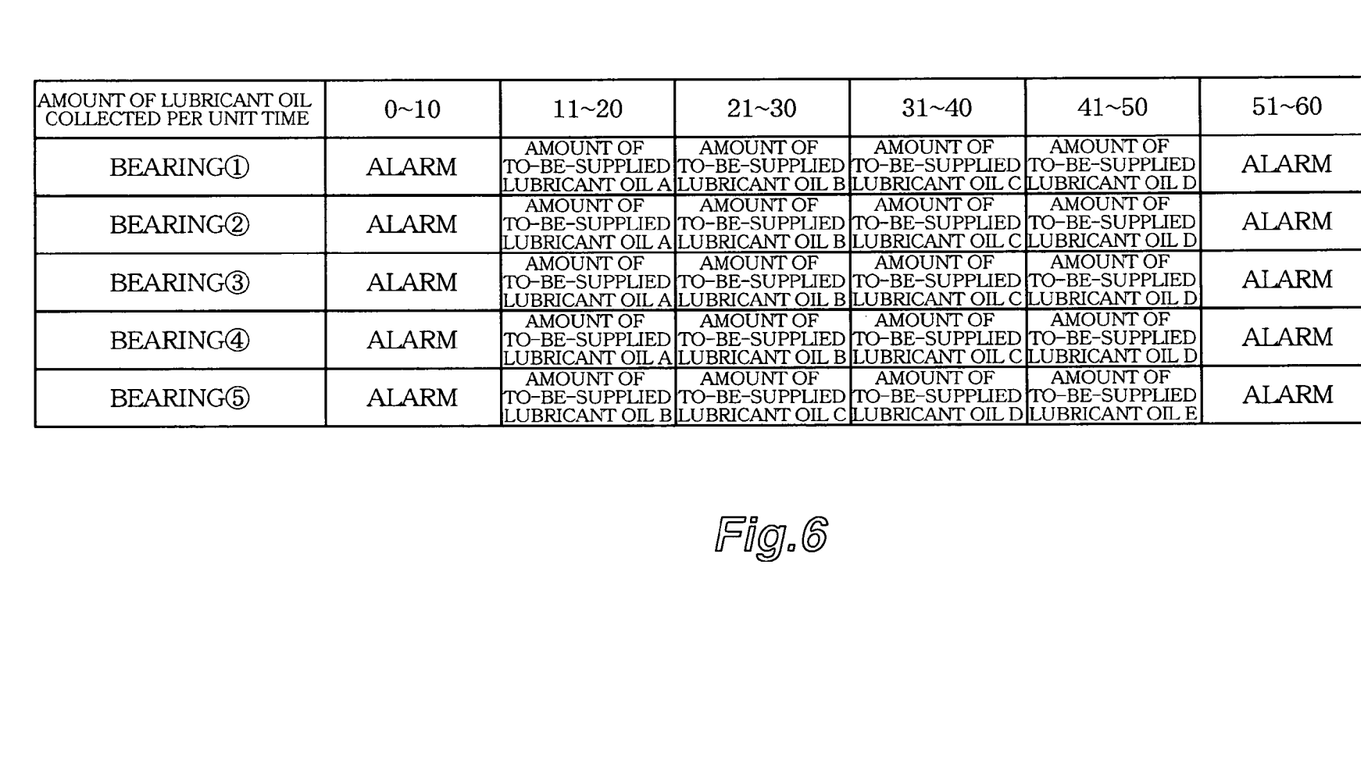
FIG. 6 is a table illustrating the relationship.

Further, as illustrated in FIG. 6, it is also possible to employ a table which defines amounts of lubricant oil to be supplied to the respective bearings, in association with amounts of lubricant oil collected per unit time.

Next, there will be described a function of stopping the machine upon detecting abnormalities from the amount of collected lubricant oil.

In a case where the amount of collected lubricant oil is less than that in a normal state, it is considered that an abnormality (such as a breakdown) of the lubricant oil supply devices 72, an abnormality (such as clogging and a crease) of the lubricant oil supply pipes 71, an abnormality (such as a breakdown) of the lubricant oil collection devices 73, an abnormality (such as clogging and a crease) of the lubricant oil collection pipes 73 or an abnormality (such as a breakdown) of the amount-of-lubricant oil sensor 74 itself has occurred. In a case where the amount of lubricant oil being supplied is actually small, if the main shaft 11 is rotated in this state, this will cause insufficient lubrication and, in the worst case, the bearings 21 to 23 can be damaged; therefore, the machine or the main shaft 11 needs to be stopped.

Referring to the graph of FIG. 5, when the amount of lubricant oil collected per unit time is equal to or less than a predetermined threshold value B, it is determined that an abnormality has occurred. Further, referring to the table of FIG. 6, when the amount of lubricant oil collected per unit time is in the range of 0 to 10, it is determined that an abnormality has occurred. On the contrary, when the amount of lubricant oil collected per unit time is greater than that in a normal state, it is considered that an abnormality of the lubricant oil supply devices 72 (such as malfunction of the function of adjusting the amount of lubricant oil to be supplied), an abnormality of the lubricant oil collection devices 73 (such malfunction of the collecting function), an abnormality of the amount-of-lubricant oil sensor 74 itself (such as malfunction of the sensor portion), or intrusion of cutting fluid or oil into the bearings 21 to 23 has occurred. When the amount of supplied lubricant oil is actually large, this will increase the stirring resistance, thereby producing abnormal heat and damaging the bearings 21 to 23.

Referring to the graph of FIG. 5, when the amount of lubricant oil collected per unit time is equal to or more than a predetermined threshold value A, it is determined that an abnormality has occurred. Further, referring to the table of FIG. 6, when the amount of lubricant oil collected per unit time is in the range of 51 to 60, it is determined that an abnormality has occurred.

Next, there will be described a function of reflecting the information obtained from the rotation-speed sensor 77 and the temperature sensor 78, in the amount of lubricant oil to be collected from the bearings 21 to 23.

Figure 7:
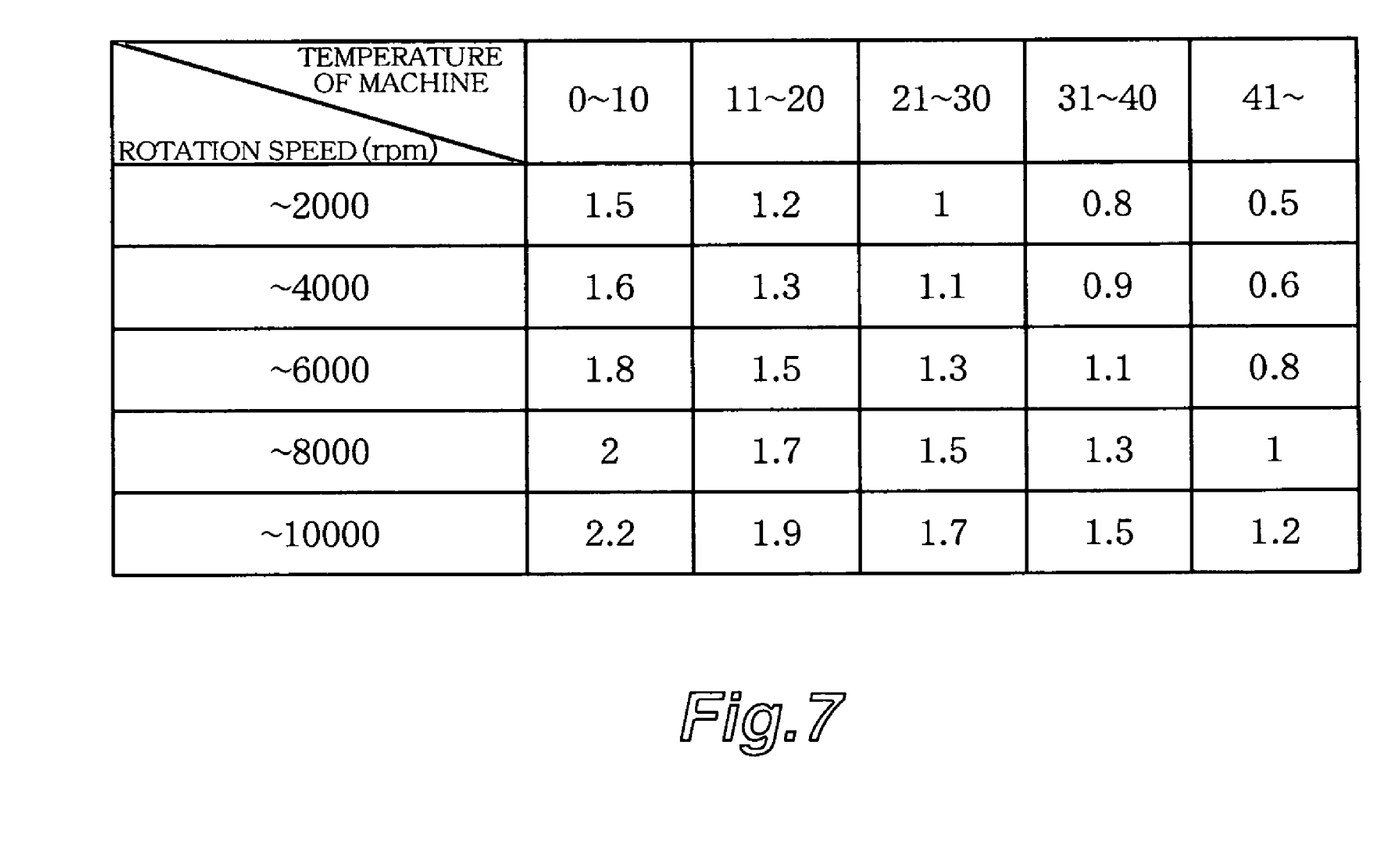
FIG. 7 is a table illustrating a relationship between the rotation speed of the main shaft and the temperature of the machine.

Signals obtained from the rotation-speed sensor 77 and the temperature sensor 78 are introduced in the control device 76. From the obtained signals, a factor is determined using a table as illustrated in FIG. 7, for example. As the temperature of the machine is increased, the viscosity of the collected lubricant oil is decreased and, therefore, the speed of movement of the lubricant oil within the lubricant oil collection pipes 73 is increased. Accordingly, it seems as if the amount of lubricant oil collected per unit time which is detected by the amount-of-lubricant oil sensor 74 had been increased. In order to correct this, the table of FIG. 7 defines factors such that they are decreased as the temperature of the machine increases. Further, as the rotation speed is increased, the influence of the centrifugal force acting on the lubricant oil supplied to the bearings 21 to 23 is increased and therefore, the tendency of the lubricant oil to be scattered is increased. Therefore, it seems as if the amount of lubricant oil collected per unit time had been increased and, therefore, the table of FIG. 7 defines factors such that they are increased with the increase in rotation speed. The amount of to-be-supplied lubricant oil is determined by applying, to FIG. 5 or FIG. 6, the value calculated from the product of the factor determined from FIG. 7 and the amount of collected lubricant oil detected by the amount-of-lubricant oil sensor. The determined amount of to-be-supplied lubricant oil is thus set as an amount of to-be-supplied lubricant oil in which the information obtained from the sensors 77 and 78 is reflected. Then, the control device 76 generates commands to the lubricant oil supply devices 73. Also, it is possible to provide a device which stops the machine on detecting an abnormality of the device as described above, from the value calculated from the product of a factor in which the values of the sensors 77 and 78 are reflected and the amount of collected lubricant oil detected by the amount-of-lubricant oil sensor 74.

Figure 8:
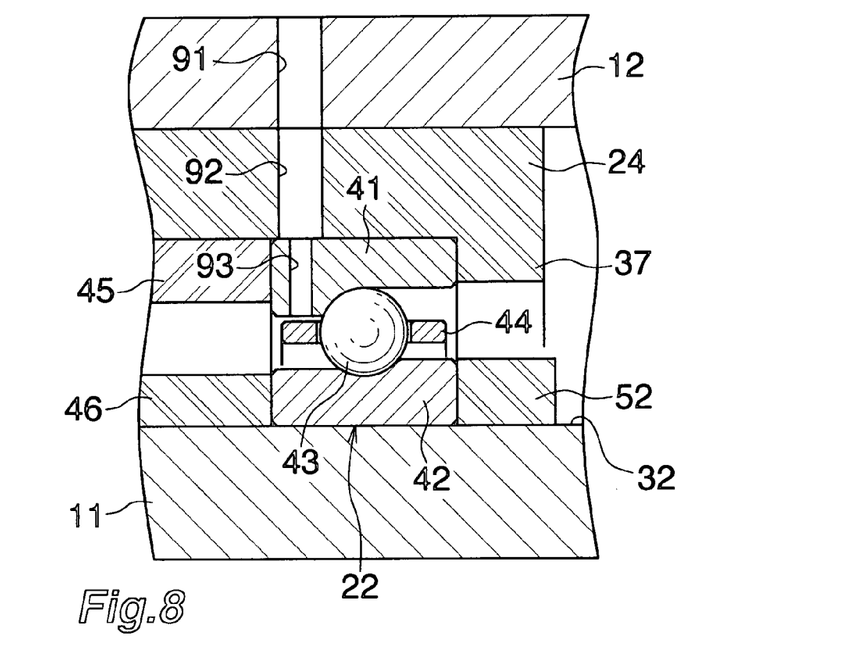
FIG. 8 is a cross-sectional view illustrating a modification of a lubricant oil supply path of FIG. 2, corresponding to FIG. 2.

FIG. 8 illustrates a modification of the lubricant oil supply path illustrated in FIG. 2. In the modification, an outer lubricant oil supply hole 91 is formed in the sleeve 12, an intermediate lubricant oil supply hole 92 is formed in the housing 24 and an inner lubricant oil supply hole 93 is formed in the outer ring 41, such that these holes are aligned along a straight line.

Figure 9:
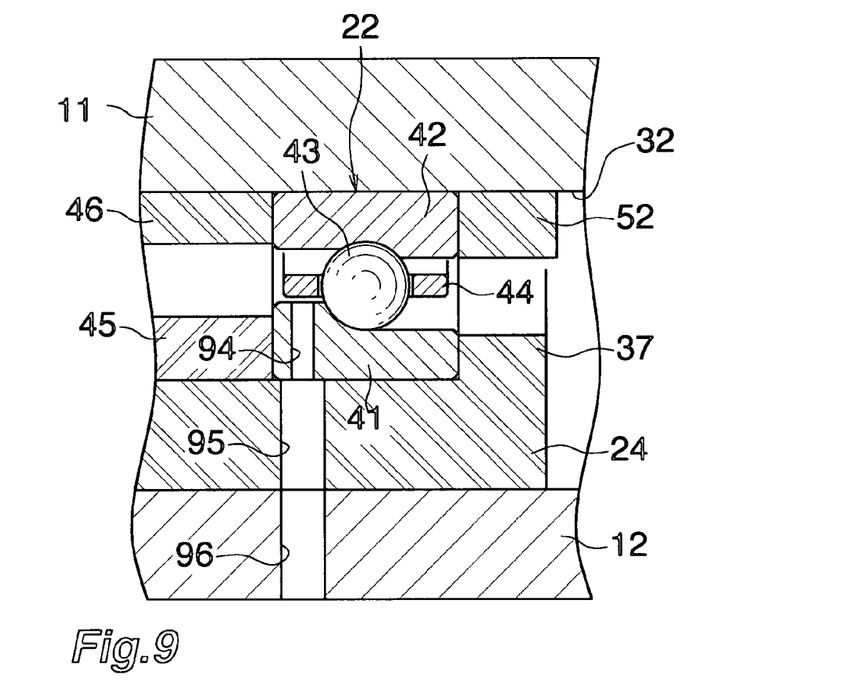
FIG. 9 is a cross-sectional view illustrating a modification of a lubricant oil ejection path of FIG. 3, corresponding to FIG. 3.

FIG. 9 illustrates a modification of the lubricant oil ejection path illustrated in FIG. 3. In the modification, an inner lubricant oil ejection hole 94 is formed in the outer ring 41, an intermediate lubricant oil ejection hole 95 is formed in the housing 24, and an outer lubricant oil ejection hole 96 is formed in the sleeve 12, such that the holes are aligned along a straight line.

The openings of the inner lubricant oil supply hole 93 and the inner lubricant oil ejection hole 94 toward the surface on which the rolling members 43 roll are positioned near the positions at which the rolling members 43 directly contact the surface on which they roll, namely the positions through which the rolling members 43 do not pass even when the rotation speed of the main shaft 11, the radial and thrust loads acting on the main shaft 11 and the like are changed. By providing the holes 93 and 94 for supplying and collecting the lubricant oil near the surface on which the rolling members 43 roll, it is possible to collect the lubricant oil used for lubricating the bearings 21 to 23 precisely and to eject an optimum amount of lubricant oil.

What is claimed is:

1. A main-shaft lubrication device comprising:
   a plurality of bearings supporting a main shaft;
   a plurality of lubricant oil supply pipes corresponding in number to the plurality of bearings, each lubricant oil supply pipe supplying lubricant oil to a corresponding one of the plurality of bearings;
   a plurality of supply means corresponding in number to the plurality of bearings, each of the plurality of supply means being operatively associated with a corresponding one of the plurality of lubricant oil supply pipes for variably supplying lubricant oil to one of the plurality of bearings;
   a plurality of lubricant oil collection pipes corresponding in number to the plurality of bearings, each lubricant oil collection pipe being in fluid communication with and collecting lubricant oil from a corresponding one of the plurality of bearings;
   a plurality of collection means corresponding in number to the plurality of bearings, each of the collection means being in fluid communication with a corresponding one of the plurality of lubricant oil collection pipes for drawing the lubricant oil from each of the plurality of bearings into the corresponding one of the lubricant oil collection pipes at constant suction force;
   a plurality of measurement means corresponding in number to the plurality of bearings, each of the measurement means being operatively associated with a corresponding one of the plurality of lubricant oil collection pipes for measuring the amount per unit time of lubricant oil collected by the collection means from the corresponding one of the plurality of bearings and providing a measurement value thereof; and
   control means for calculating amounts of lubricant oil to be supplied for each bearing based on the amount per unit time of lubricant oil provided by each of the plurality of measurement means and a predetermined amount of lubricant oil supply per collected amount, and controlling each of the plurality of supply means to supply the calculated amount of lubricant oil to each of the plurality of bearings.

2. The main-shaft lubrication device according to claim 1, wherein each of the bearings includes an inner ring, an outer ring, and rolling members sandwiched between the inner ring and the outer ring, the outer ring is provided with a lubricant oil ejection hole extending in a radial direction from its inner peripheral surface to its outer peripheral surface, and the collection means collects the lubricant oil through the lubricant oil ejection hole.

3. The main-shaft lubrication device according to claim 1, further comprising a part for stopping rotation of the main shaft when the measurement value provided by the measurement means is off by more than a predetermined range.

4. The main-shaft lubrication device according to claim 1, each of the plurality of measurement means comprising at least one sensor, wherein the control means further functions to reflect information obtained from the at least one sensor in the amount of lubricant oil to be supplied from the supply means.

5. The main-shaft lubrication device according to claim 4, wherein the at least one sensor is at least one of a temperature sensor and a main-shaft rotation speed sensor.

\* \* \* \* \*